United States Patent [19]

Henault

[11] 4,043,305
[45] Aug. 23, 1977

[54] CONTROL DEVICE FOR REGULATING THE COMPOSITIONS OF THE INLET AND EXHAUST GASES OF AN INTERNAL COMBUSTION ENGINE

[75] Inventor: Claude Henault, Chevilly Larue, France

[73] Assignees: Regie Nationale des Usines Renault, Boulogne-Billancourt; Automobiles Peugeot, Paris, both of France

[21] Appl. No.: 621,770

[22] Filed: Oct. 14, 1975

[30] Foreign Application Priority Data

Oct. 25, 1974  France .................. 74.35834

[51] Int. Cl.$^2$ .................. F02B 33/00; F02M 23/04
[52] U.S. Cl. .................. 123/119 A; 123/119 D; 123/119 DB; 123/124 R
[58] Field of Search ....... 123/119 A, 119 D, 119 DB, 123/124 R

[56] References Cited

U.S. PATENT DOCUMENTS

| | | | |
|---|---|---|---|
| 3,580,233 | 5/1971 | Busse | 123/119 A |
| 3,643,641 | 2/1972 | Busse | 123/119 D |
| 3,713,428 | 1/1973 | Sandhagen | 123/119 A |
| 3,844,260 | 10/1974 | Scott | 123/124 R |
| 3,916,610 | 6/1976 | Thurston | 123/119 A |
| 3,928,966 | 12/1975 | Goto | 123/119 A |
| 3,929,118 | 12/1975 | Leong | 123/119 A |
| 3,931,813 | 1/1976 | Horie | 123/119 A |
| 3,951,115 | 4/1976 | Brisko | 123/119 A |
| 3,963,011 | 6/1976 | Saito | 123/119 A |
| 3,970,052 | 7/1976 | Andoh | 123/119 D |

*Primary Examiner*—Carroll B. Dority, Jr.
*Assistant Examiner*—Daniel J. O'Connor
*Attorney, Agent, or Firm*—Owen, Wickersham & Erickson

[57] ABSTRACT

The emission of atmospheric pollutants in the exhaust gases of an internal combustion engine having a carburettor is reduced by regulating the composition of the inlet gases, and hence the exhaust gases, of the engine by means of a control device comprising an extra air duct, which has a control valve and bypasses the carburetor, for supplying extra air to the engine inlet, a recirculating duct for recirculating exhaust gases to the engine inlet, a controller which is responsive to signals from an exhaust gas composition sensor installed in the exhaust outlet of the engine and which controls an electrically operated valve in the recirculating duct, and a pressure-sensitive device which communicates with the recirculating duct upstream of the electrically operated valve and which actuates the extra air control valve to regulate the supply of extra air to the engine through the extra air duct.

5 Claims, 1 Drawing Figure

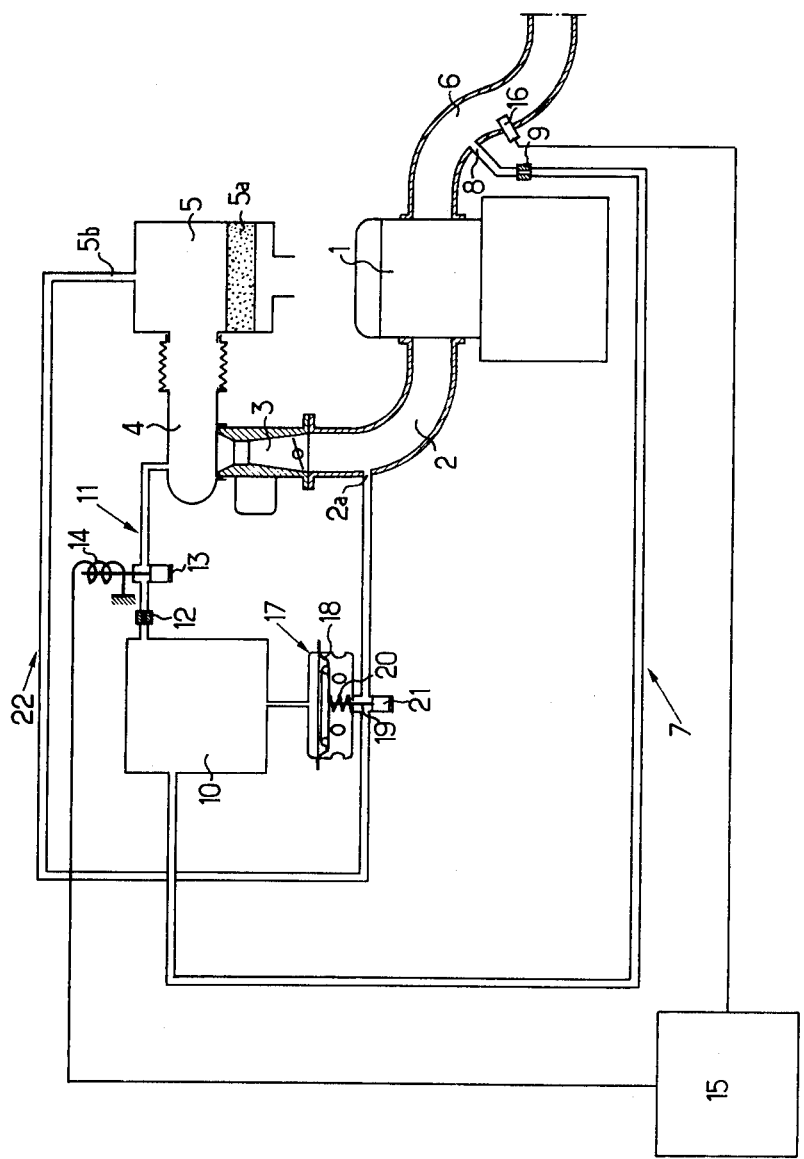

CONTROL DEVICE FOR REGULATING THE COMPOSITIONS OF THE INLET AND EXHAUST GASES OF AN INTERNAL COMBUSTION ENGINE

The present invention relates to devices for reducing atmospheric pollution by internal combustion engines having carburettors by regulating the richness of the combustible mixture in dependence on the composition of the exhaust gases, their pressure in the exhaust manifold and the rate of flow of combustible mixture.

Most present day carburettor engines have a carburettor which is intended to provide a combustible mixture which is correct for all engine operating conditions. However, due to the fact that internal combustion engines operate on an alternating cycle, the carburettor has to deliver mixture in the form of pulses and this considerably disturbs mixture composition in dependence on pulse frequency. Consequently the carburettor cannot ensure a supply of weak mixture under all engine operating conditions.

The problems of pollution and energy consumption are becoming increasingly critical. Consequently it is desirable, and it is also possible, to recirculate a portion of the exhaust gases. This not only reduces fuel consumption and reduces the output of oxides of nitrogen, but also makes it possible to operate the engine on weaker mixtures.

It is current practice to inject extra air into the inlet manifold of the engine, through a duct which bypasses the carburettor, in order to weaken the combustible mixture.

It is also known to use detectors which sense the exhaust gas composition. The detectors make it possible to keep the composition of the combustible mixture close to the stoichiometric composition.

According to this invention, a control device for regulating the composition of the inlet and hence the exhaust gases of an internal combustion engine having a carburettor, the device being of the kind which comprises an extra-air duct, which has a control valve and bypasses the carburettor, for supplying extra air to the inlet of the engine, and a recirculating duct for recirculating exhaust gases to the inlet of the engine, is characterised in that it comprises a controller responsive to signals from an exhaust gas composition sensor installed in the exhaust outlet of the engine, the controller controlling an electrically operated valve in the recirculating duct, and a pressure-sensitive device which communicates with the recirculating duct upstream of the electrically operated valve, and which actuates the extra air control valve which regulates the supply of extra air to the engine through the extra air duct.

The device in accordance with the invention makes it possible to correct the richness of the combustible mixture even when the engine is functioning in a disturbed manner. Such corrections have not previously been possible.

The recirculating duct, through which a portion of the exhaust gases flow back to the inlet side of the engine, preferably contains a mixing chamber, situated upstream of the electrically operated valve, for mixing and cooling the recirculated exhaust gases.

The pressure-sensitive device, which is sensitive to the pressure in the exhaust outlet and which controls the extra air valve, may be connected to the mixing chamber. In practice the pressure-sensitive device can take the form of a simple diaphragm connected pneumatically to the bottom of the mixing chamber. Fixed to the diaphragm is a rod which opens the extra air control valve against the action of a return spring.

Correct functioning of the engine requires that certain requirements must be satisfied: Firstly, the correction deriving from the exhaust gas composition sensor must be as small as possible, to prevent the engine from hunting, due to fluctuations in the fuel-to-air ratio and in the rate of flow of recirculated exhaust gases. Secondly, the corrections must remain constant, irrespective of engine operating conditions.

Consequently the extra air supplied to the engine must, in the first place, vary proportionately with the rate of flow of combustible mixture into the engine, without this proportional variation being disturbed by the applied correction. Secondly, the flow of extra air must constantly be corrected in dependence on exhaust gas composition and pressure. Finally, the extra air must be supplied to the engine at a moderate rate of flow.

An example of a device in accordance with the invention will now be described with reference to the accompanying drawing which is a diagrammatic representation of the device applied to an engine.

An internal combustion engine 1 has a conventional inlet system comprising an inlet manifold 2 through which flows a combustible mixture produced by a carburettor 3. The carburettor 3 receives air through a main air inlet duct 4 from an air filter housing 5 containing a filtering device 5a. Fuel is fed to the carburettor by a device which is not shown in the drawing.

The engine 1 has an exhaust pipe 6 through which exhaust gases are delivered to the atmosphere. A recirculating duct 7 connected at 8 to the exhaust pipe 6 contains a constricted orifice 9.

The duct 7 leads to a mixing chamber 10 for mixing and cooling the exhaust gases. From the chamber 10 a delivery duct 11 leads to the air inlet duct 4. The exhaust gas delivery duct 11 contains a solenoid valve 13 and, upstream of this, a constricted orifice 12.

A coil 14 of the solenoid valve 13 receives current from a controller 15 which responds to electric signals from a sensor 16 in the exhaust pipe 6. The signals delivered by the sensor 16 give information on the composition of the exhaust gases.

The bottom of the mixing chamber 10 is connected to a pressure-sensitive device 17 containing a diaphragm 18 which is mechanically connected to an actuating rod 19. The rod 19 opens a valve 21 against the action of a return spring 20. The valve 21 controls the flow of air passing through an extra air duct 22 which is connected at one end at 5b to the air filter housing 5 and at the other end at 2a to the mixture inlet manifold 2 of the engine.

The kind of signals delivered by the sensor 16 depend on the nature of the sensor. If a zirconium oxide detector is used, voltage signals are delivered and these vary abruptly making it possible to obtain a combustible mixture of stoichiometric composition in the mixture inlet manifold 2. On the other hand, if the detector is of the kind which detects carbon monoxide, then a voltage signal is delivered which is proportional to the concentration of carbon monoxide in the exhaust gases. In either case the voltage signals delivered by the sensor 16 are converted by the controller 15 into a controlling electric current which actuates the solenoid valve 13 in the exhaust gas recirculating duct 11.

The device functions as follows: As long as the mixture supplied to the engine is rich the exhaust gas pressure, which is transmitted through the duct 7 to the chamber 10 and acts on the diaphragm 18, keeps the valve 21 open, allowing extra air to flow into the inlet manifold 2 of the engine. It should be observed that the exhaust gas pressure conveys information on the power output of the engine. Consequently, the degree of opening of the valve 21 should, to obtain the best effect, vary in the desired manner as a function of exhaust gas pressure.

If, in spite of the admission of extra air, the mixture is still slightly rich, the sensor 16 does not deliver a signal. This situation should be corrected by opening the valve 21 slightly more. On the other hand, as soon as the mixture becomes slightly weak, the sensor 16 delivers a signal to the controller 15, which responds by sending current through the coil 14. This opens the solenoid valve 13 and allows exhaust gases to escape from the chamber 10, so that the pressure on the diaphragm 18 is reduced and the valve 21 closes to some extent. This reduces the flow of extra air through the extra air duct 22. Subsequently when the mixture again becomes rich the controller 15 causes the solenoid valve 13 to close, returning the system to its initial state.

The regulation of the pressure in the chamber 10 ensures that the exhaust gases contain little hydrocarbon and unburnt carbon monoxide: it simultaneously provides a modulated recycling of exhaust gases, which reduces the concentration of oxides of nitrogen in the exhaust gases discharged from the engine.

I claim:

1. A control device useful in an internal combustion engine having a carburetor, an engine inlet, and an exhaust outlet, for regulating the composition of the inlet gases and hence the exhaust gases, said control device having first passage means bypassing said carburettor for supplying extra air to said engine inlet, a control valve in said first passage means, second passage means for recirculating exhaust gases to said engine inlet, an electrically operated valve in said second passage means, an exhaust gas composition sensor installed in said exhaust outlet of said engine for providing signals dependent on the composition of the engine exhaust gases, and a controller responsive to said signals from said exhaust gas composition sensor to control said electrically operated valve and thereby the flow of exhaust gases through said second passage means, the improvement wherein said control device further comprises a pressure-sensitive device communicating with said second passage means upstream of said electrically operated valve, and means connecting said pressure-sensitive device to said control valve in said first passage means whereby said control valve is operated to regulate the supply of extra air to said engine inlet in response to the pressure in said second passage means.

2. A control device as claimed in claim 1, wherein said second passage means includes means situated upstream of said electrically operated valve, said means defining a mixing chamber for mixing and cooling said recirculated exhaust gases.

3. A control device as claimed in claim 2, wherein said pressure-sensitive device communicates with said mixing chamber.

4. A control device as claimed in claim 1, wherein said engine inlet includes air duct means for delivering air to said carburettor, and said second passage means leads into said air duct means.

5. A control device as claimed in claim 2, wherein said pressure-sensitive device comprises a diaphragm and spring means acting on said diaphragm in opposition to the pressure in said mixing chamber which communicates with said pressure-sensitive device, and said means connecting said pressure-sensitive device to said control valve comprises an actuating rod mechanically connected to said diaphragm and said control valve whereby said control valve is opened when said diaphragm is moved against the action of said return spring.

* * * * *